(12) United States Patent
Joyner

(10) Patent No.: US 11,375,735 B1
(45) Date of Patent: Jul. 5, 2022

(54) POPCORN SEASONING MACHINE

(71) Applicant: Nicholas Joyner, Lakeland, FL (US)

(72) Inventor: Nicholas Joyner, Lakeland, FL (US)

( * ) Notice: Subject to any disclaimer, the term of this patent is extended or adjusted under 35 U.S.C. 154(b) by 127 days.

(21) Appl. No.: 16/842,144

(22) Filed: Apr. 7, 2020

(51) Int. Cl.
| | |
|---|---|
| *A23L 7/191* | (2016.01) |
| *A23P 20/12* | (2016.01) |
| *B05C 19/06* | (2006.01) |
| *A23G 3/20* | (2006.01) |
| *B05C 11/06* | (2006.01) |
| *B05C 19/00* | (2006.01) |

(52) U.S. Cl.
CPC ............ *A23L 7/191* (2016.08); *A23G 3/2076* (2013.01); *A23P 20/12* (2016.08); *B05C 19/06* (2013.01); *B05C 11/06* (2013.01); *B05C 19/008* (2013.01)

(58) Field of Classification Search
CPC ....... A23G 3/2076; A23L 7/191; A23L 7/161; A23P 20/12; A23P 20/15; A23P 20/18; B05C 19/06; B05C 19/008; B05C 11/06; G07F 17/0078
USPC ........... 118/13, 19–22; 426/96; 99/494, 467, 99/474, 323.5, 323.8
See application file for complete search history.

(56) References Cited

U.S. PATENT DOCUMENTS

| | | | | |
|---|---|---|---|---|
| 2,812,704 | A | | 11/1957 | Hawks |
| 4,512,247 | A | * | 4/1985 | Friedman ................. A23G 3/26 118/19 |
| 7,082,891 | B2 | * | 8/2006 | Watson ............... A23G 3/2092 118/19 |
| 8,276,504 | B2 | | 10/2012 | Korin |
| 2020/0029604 | A1 | * | 1/2020 | Habenicht ............... A23L 7/191 |

FOREIGN PATENT DOCUMENTS

| | | | |
|---|---|---|---|
| CN | 102038441 | * | 5/2011 |
| DE | 202012009828 | * | 1/2013 |

* cited by examiner

*Primary Examiner* — Laura Edwards
(74) *Attorney, Agent, or Firm* — Sanchelima & Associates, P.A.; Christian Sanchelima; Jesus Sanchelima

(57) ABSTRACT

A popcorn seasoning machine is disclosed. The popcorn seasoning machine includes a receptacle having a forced air system. A user then inputs a selected seasoning and popcorn into the device and depresses a control button for injecting air into the interior of the container for mixing popcorn and the seasoning. As a result, the seasoning is evenly distributed on the popcorn to facilitate an enjoyable popcorn eating experience. The device further includes an air pump therein which manually provides are to a vent platform to a top end of the receptable. The top end also includes a hingedly attached dome which seals the top end of the receptacle.

9 Claims, 5 Drawing Sheets

POPCORN SEASONING MACHINE

BACKGROUND OF THE INVENTION

1. Field of the Invention

The present invention relates to a popcorn seasoning machine and, more particularly, to a popcorn seasoning machine that receives popcorn and a desired seasoning within a dome, the dome is then provided with air through an air pump to evenly season the popcorn.

2. Description of the Related Art

Several designs for popcorn machines have been designed in the past. None of them, however, include a popcorn seasoning machine including a receptacle having a forced air system. A user then inputs a selected seasoning and popcorn into the device and depresses a control button for injecting air into the interior of the container for mixing popcorn and the seasoning. As a result, the seasoning is evenly distributed on the popcorn to facilitate an enjoyable popcorn eating experience. The device further includes an air pump therein which manually provides are to a vent platform to a top end of the receptable. The top end also includes a hingedly attached dome which seals the top end of the receptacle. A user places popcorn and a selected seasoning within this dome and then presses a button to actuate the air system and provide air within the dome. The machine may also be provided in a larger body having three independent popcorn seasoning machines. The three domed version of the device may be suitable for placement in movie theaters and arenas. It is known that individuals who purchase popcorn often have the desire to season the popcorn with a seasoning of their choice. It is also known that it is difficult for a user to evenly season their popcorn with the current seasoning methods provided by concession stands. Therefore, there is need for a popcorn seasoning machine in order to evenly and effectively season popcorn.

Applicant believes that a related reference corresponds to U.S. Pat. No. 8,276,504 issued for a popcorn making machine that uses hot air and has a unit for coating the popcorn with seasoning. Applicant believes that another related reference corresponds to U.S. Pat. No. 2,812,704 issued for a coin operated popcorn machine that sprays seasoning of the popped corn. However, the cited references differ from the present invention because they fail to disclose a dome like shape which receives pumped air to then mix popcorn with a preselected seasoning. The device allows a user to manually pump the air within the dome in order to achieve their desired mix of seasoning and popcorn.

Other documents describing the closest subject matter provide for a number of more or less complicated features that fail to solve the problem in an efficient and economical way. None of these patents suggest the novel features of the present invention.

SUMMARY OF THE INVENTION

It is one of the objects of the present invention to provide a popcorn seasoning machine which allows a user to evenly and efficiently distribute a preselected seasoning to a predetermined amount of popcorn.

It is another object of this invention to provide a popcorn seasoning machine that allows a user to manually pump air within a dome of the machine to reach a desired mixture of seasoning and popcorn.

It is still another object of the present invention to provide a popcorn seasoning machine which may be provided in designated trade areas such as movie theaters, hotel lobbies, apartment complexes, state fairs, cruises, banks, arcades, and other locations.

It is yet another object of this invention to provide such a device that is inexpensive to implement and maintain while retaining its effectiveness.

Further objects of the invention will be brought out in the following part of the specification, wherein detailed description is for the purpose of fully disclosing the invention without placing limitations thereon.

BRIEF DESCRIPTION OF THE DRAWINGS

With the above and other related objects in view, the invention consists in the details of construction and combination of parts as will be more fully understood from the following description, when read in conjunction with the accompanying drawings in which.

DETAILED DESCRIPTION OF THE EMBODIMENTS OF THE INVENTION

Figure 1:
FIG. 1 represents an operational isometric view of popcorn seasoning machine 10 in use in accordance to an embodiment of the present invention.

Referring now to the drawings, where the present invention is generally referred to with numeral 10, it can be observed a popcorn seasoning machine 10 which basically includes a housing assembly 20 and a pump assembly 40.

Figure 2:
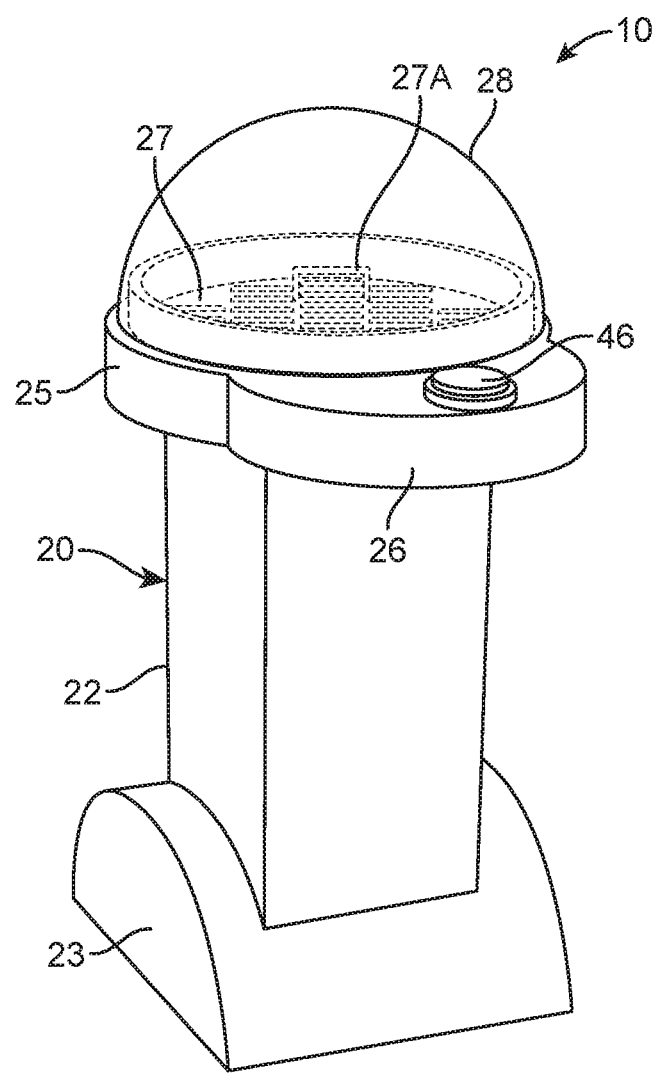
FIG. 2 shows an isometric view of popcorn seasoning machine 10 having a housing assembly 20 and a pump assembly 40 in accordance to an embodiment of the present invention.

Housing assembly 20 includes a body 22, a base 23, and a circular platform 25. In one embodiment, housing assembly 20 is made of any suitable material such as metal, plastic, or any other sturdy material. Additionally, body 22 may have a substantially rectangular shape and is coupled to base 23. Base 23 is positioned underneath body 22 to create a suitable support for housing assembly 20 on a ground surface. In one embodiment, base 23 has a semi-circular shape with a flat portion and a rounded portion. The flat portion of base 23 is then received by a flat surface and body 22 extends within the rounded portion as observed in FIG. 2 of the provided drawings. Other embodiments may feature other shapes and sizes of body 22 and base 23.

Circular platform 25 is located on a top end of body 22. Circular platform 25 may have an area that is greater than an area of the top end of body 22. Additionally, circular platform 25 may also have a protrusion 26 extending outwardly and away form a front end of circular platform 25. In one implementation, protrusion 26 may also have a semi-circular shape. Other implementations and embodiments may feature protrusion 26 having a variety of other shapes.

Figure 4:
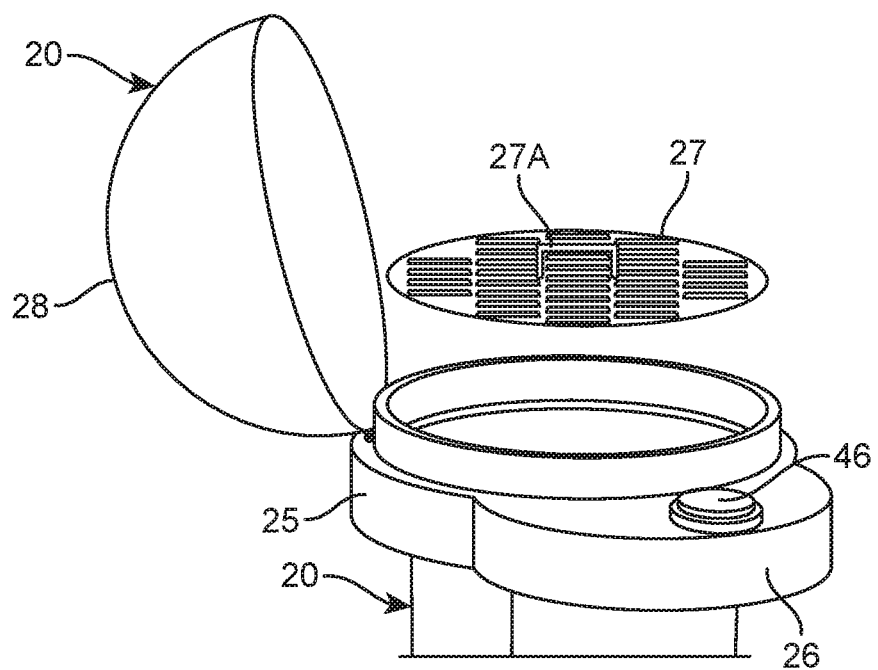
FIG. 4 is a representation of an enlarged isometric view of housing assembly 20 depicting dome 28 in an open position in accordance to an embodiment of the present invention.
Figure 5:
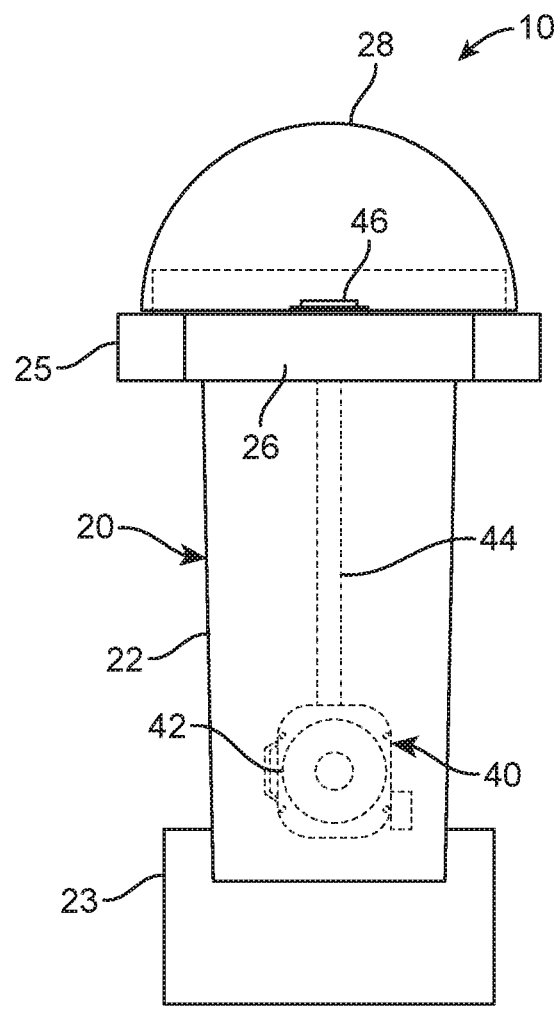
FIG. 5 shows a front interior view of housing assembly 20 depicting pump assembly 40 therein in accordance to an embodiment of the present invention.

Circular platform 25 further includes a venting platform 27 mounted to a top end. Venting platform 27 may have a circular shape that is suitable enough to be fitted within the diameter of circular plat form 25. In one embodiment, venting platform 27 resembles a configuration with that of an air vent and includes a plurality of vent openings thereon. These vent openings allow air supplied form pump assembly 40 to pass through venting platform 27. Additionally, vent openings need not have any specific type of opening shape and must just be suitable to allow air to pass through. Further, venting platform 27 is provided as being a removable platform. Venting platform 27 is provided with a handle 27A at a center portion allowing a user to grasp it and remove the platform. The removable nature of venting platform may be observed in FIG. 4 of the provided drawings. Other embodiments may feature a venting platform 27 provided as an integral attachment to circular platform 25.

Figure 3:
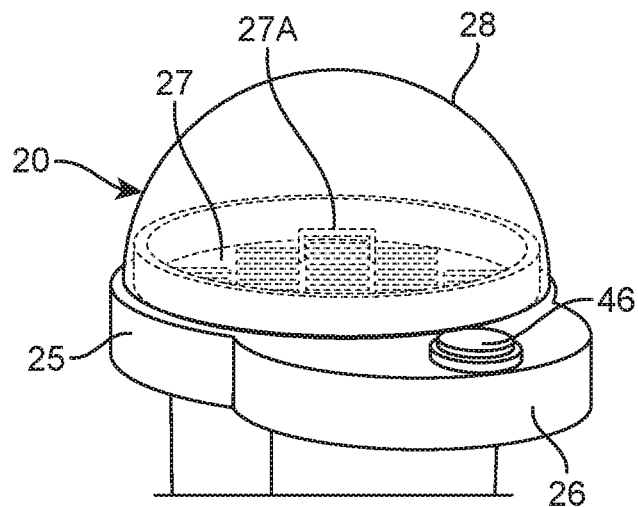
FIG. 3 illustrates an enlarged isometric view of housing assembly 20 depicting dome 28 in a closed position in accordance to an embodiment of the present invention.

Circular platform 25 is further provided having dome 28 mounted thereon. In one implementation, dome 28 is provided as being hingedly attached to circular platform 25 as observed in FIG. 4. Additionally, circular platform is positioned in such a way that it entirely encases and covers venting platform 27 as observed in FIG. 3. Other implementations may introduce a dome 28 that is absent of hinges, however, it is important that dome 28 still be removable from circular platform 25 to access venting platform 27 therein. Further, dome 28 may be made of a transparent material, thereby allowing a user to clearly observe the contents within dome 28. Other implementations may feature a dome 28 made of a non-transparent material.

Pump assembly 40 includes an air pump 42 and tubing 44 housed entirely within body 22. In one embodiment, air pump is a manual air pump that must continuously operate by a user in order to pump air. In one embodiment, air pump 42 is actuated through an actuation button 46 that is located on protrusion 26 of housing assembly 20. Air pump 42 may only be actuated to supply air when actuation button 46 is in a pressed position. Further, tubing 44 may be any suitable tubing material that allows for the passage of air. Tubing 44 couples air pump 42 to venting platform 27 to supply air thereon. Other embodiments may feature an air pump 42 that is automatically operated upon the depression of actuation button 46.

In the present implementation, popcorn seasoning machine 10 is used to mix a seasoning 52 with popcorn. A user may open dome 28 to then input popcorn onto venting platform 27. A user may then select a seasoning 52 within a container from a provided rack 50 near the machine 10. These seasonings may include several flavors such as but not limited to buffalo wing flavor, garlic parmesan flavor, jalapeno flavor, nacho flavor, a salt and pepper flavor, a ranch flavor, a white cheddar flavor, a sour cream flavor, a caramel flavor, a barbeque flavor, a salt and vinegar flavor, or any other flavor that is suitable for seasoning popcorn. The user then places the seasoning on the popcorn which has been placed within the machine 10. A user may choose to mix various seasonings within machine 10.

The user may then close dome 28 and then actuate air pump 42 through actuation button 46. Air is then supplied to venting platform 27 and then mixes seasoning 52 and the popcorn therein. This allows for the seasoning 52 to be evenly distributed along the popcorn to facilitate an enjoyable eating experience. A user may continuously press actuation button 46 until they have achieved the desired mixture. The user may then open dome 28 and remove venting platform 27 having the popcorn through handle 27A. The popcorn may then be inserted within a popcorn bag for the user's enjoyment. Other implementations may feature an additional scooper provided with the venting platform 27. The scooper will allow a user to remove the popcorn without having to remove venting platform 27. Popcorn seasoning machine 10 provides the most enjoyable and efficient way to season popcorn. In yet another embodiment, a trap door may be provided to body 22 which may then dispense the popcorn into a bag. In this embodiment, a bag is placed under the machine and venting platform 27 then splits in half and the popcorn is dispensed through the trap door and into the bag. This configuration operates similarly to how a soda machine dispenses soda into a cup.

Other embodiments of the present invention may include other means for providing seasoning onto popcorn within body 22. In one embodiment, venting platform 27 may be replaced with a vibrating platform instead. The vibrating platform may be used to provide vibrations which evenly spread popcorn seasoning with the popcorn to be used instead of the air ventilation system. Other plates such as spring platforms may be used. It should be understood that any suitable platform which provides a tossing or bouncing motion may be used within body 22.

Figure 6:
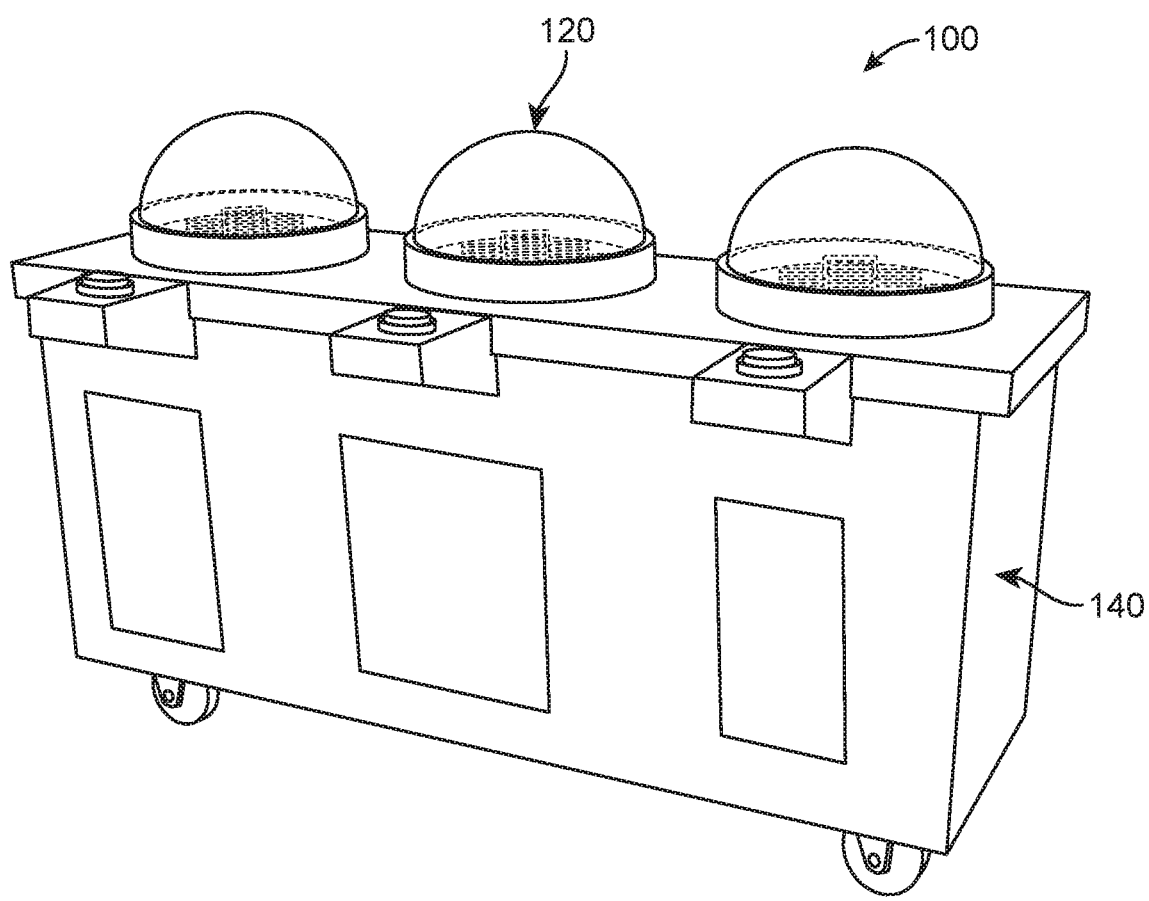
FIG. 6 illustrates an isometric view of popcorn seasoning machine 100 in accordance to another embodiment of the present invention.

FIG. 6 observes popcorn seasoning machine 100 in accordance to another embodiment of the present invention. In this embodiment, the housing assembly includes a rectangular body with a bottom end having wheels. Additionally, this machine includes three seasoning devices thereon. The top end of the rectangular body includes three dome structures to receive three separate servings of popcorn. These dome structures may be hingedly mounted thereon as provided for the machine 10. Each of the domes include a venting platform therein which is removable form the domes. The rectangular body also includes air pumps therein which provide air to the venting platforms. These air pumps are then actuated by buttons that are located on a protruding section of the rectangular body.

Popcorn seasoning machine 10 and popcorn seasoning machine 100 may be placed in various locations such as but not limited to movie theaters, hotel lobbies, apartment complexes, state fairs, circuses, cruises, banks, arcades and the like.

The foregoing description conveys the best understanding of the objectives and advantages of the present invention. Different embodiments may be made of the inventive concept of this invention. It is to be understood that all matter disclosed herein is to be interpreted merely as illustrative, and not in a limiting sense.

What is claimed is:

1. A system for a popcorn seasoning machine, comprising:
   a. a housing assembly including a body, a base, and a top end, wherein said body is coupled to said base, wherein the base has a larger length and a larger width than said body, said top end having a circular shape and a dome hingedly attached thereon, wherein said top end includes a venting platform removably mounted thereon, said venting platform having a plurality of air vents, wherein said dome entirely and removably covers said venting platform, wherein said venting platform is configured to receive popcorn and a seasoning mixture therein, wherein said venting platform includes a handle on a center portion; and
   b. a pump assembly including an air pump that is manually operated located entirely within said body, wherein said air pump is communicably coupled to said venting platform to supply air thereon, a button provided on said main body to actuate said air pump, wherein the air supplied through the venting platform mixes the seasoning mixture and the popcorn.

2. The system for a popcorn seasoning machine of claim 1 wherein said body has a rectangular shape.

3. The system for a popcorn seasoning machine of claim 1 wherein said base has a semi-circular shape.

4. The system for a popcorn seasoning machine of claim 1 wherein said dome is made of a transparent material.

5. The system for a popcorn seasoning machine of claim 1 wherein said body includes a protrusion having said button located thereon.

6. The system for a popcorn seasoning machine of claim 1 wherein said air pump is configured to be actuated only when said button is in a pressed position.

7. The system for a popcorn seasoning machine of claim 1 wherein said system includes a plurality of seasoning containers placed on a rack.

8. A system for a popcorn seasoning machine, consisting of:
   a. a plurality of seasoning containers placed on a rack having a seasoning mixture therein, said seasoning mixture having flavors including a buffalo wing flavor, a jalapeno flavor, a garlic parmesan flavor, a nacho flavor, a salt and pepper flavor, a ranch flavor, a white cheddar flavor, a sour cream and onion flavor, a caramel flavor, a barbeque flavor, or a salt and vinegar flavor;
   b. a housing assembly including a main body, a base, and a dome, wherein said main body has a rectangular shape and is coupled to said base, wherein said base includes a semi-circular shape with a planar portion and a rounded portion, said planar portion received by a ground surface, wherein the base has a larger length and a larger width than said body, said main body extending within said rounded portion, wherein said main body includes a circular platform at a top end that receives said dome, said circular platform including a protrusion protruding outwardly and away forming said main body, a venting platform placed on top of said circular platform, said venting platform having a plurality of air vents thereon, wherein said venting platform is removable from said circular platform, said venting platform having a handle on a center portion, wherein said dome is placed over said venting platform to be entirely covered, wherein said dome is hingedly attached to said circular platform, wherein said dome is made of a transparent material, wherein said venting platform receives said seasoning mixture thereon, wherein said venting platform is configured to receive popcorn and a seasoning mixture therein; and
   c. a pump assembly including an air pump housed within said main body, said air pump supplying air to said venting platform through tubing therein, an actuation button provided on said protrusion, wherein said actuation button has a circular shape, said actuation button actuates said air pump, wherein said air pump is configured to be actuated only when said actuation button is in a depressed position, wherein the air supplied through the venting platform mixes the seasoning mixture and the popcorn.

9. A system for a popcorn seasoning machine, comprising:
   a. a housing assembly including a rectangular body having a bottom end and a top end, said bottom end having wheels mounted thereon, said top end including three dome structures each housing a venting platform therein, wherein said three dome structures are hingedly mounted to said rectangular body, wherein said venting platform is removable from said rectangular body, wherein said venting platform is configured to receive popcorn and a seasoning mixture therein; and
   b. a pump assembly including an air pump housed within said rectangular body to provide said venting platform with air, wherein said air pump is actuated by a button located on a protruding section of a front end of said rectangular body, wherein the air supplied through the venting platform mixes the seasoning mixture and the popcorn.

* * * * *